US011570675B2

(12) United States Patent
Cuevas Ramirez

(10) Patent No.: US 11,570,675 B2
(45) Date of Patent: Jan. 31, 2023

(54) IMS REGISTRATION MANAGEMENT

(71) Applicant: BRITISH TELECOMMUNICATIONS PUBLIC LIMITED COMPANY, London (GB)

(72) Inventor: Maria Cuevas Ramirez, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 62 days.

(21) Appl. No.: 16/960,359

(22) PCT Filed: Jan. 14, 2019

(86) PCT No.: PCT/EP2019/050800
§ 371 (c)(1),
(2) Date: Jul. 7, 2020

(87) PCT Pub. No.: WO2019/141623
PCT Pub. Date: Jul. 25, 2019

(65) Prior Publication Data
US 2021/0068019 A1      Mar. 4, 2021

(30) Foreign Application Priority Data
Jan. 18, 2018   (EP) .................................... 18152337

(51) Int. Cl.
*H04W 36/14*   (2009.01)
*H04L 65/1016*  (2022.01)
(Continued)

(52) U.S. Cl.
CPC ......... *H04W 36/14* (2013.01); *H04L 65/1016* (2013.01); *H04L 65/1073* (2013.01);
(Continued)

(58) Field of Classification Search
CPC ... H04W 36/14; H04W 36/385; H04W 88/06; H04W 88/16; H04W 36/12;
(Continued)

(56) References Cited

U.S. PATENT DOCUMENTS 7,082,301 B2   7/2006   Jagadeesan et al.
8,064,403 B2   11/2011  Zhao et al.
(Continued)

FOREIGN PATENT DOCUMENTS

CN   106470465   3/2017
CN   106576395   4/2017
(Continued)

OTHER PUBLICATIONS

Lennart Norell, et al., "Wi-Fi calling—extending the reach of VoLTE to Wi-Fi", Ericsson Review, Jan. 30, 2015, 8 pages.
(Continued)

*Primary Examiner* — Yaotang Wang
(74) *Attorney, Agent, or Firm* — Nixon & Vanderhye P.C.

(57) ABSTRACT

In a LTE network user devices can access voice application service via Voice over LTE (VoLTE) and Voice over WiFi (VoWiFi). To detect faults in the data link associated with an evolved packet data gateway for providing access by the user device to the LTE network from a non-trusted network which will affect VoWiFi capability, a packet data gateway monitors the status of ePDG and if a fault is detected, the user device is notified that it should connect to voice services via VoLTE.

19 Claims, 5 Drawing Sheets

Figure 1:
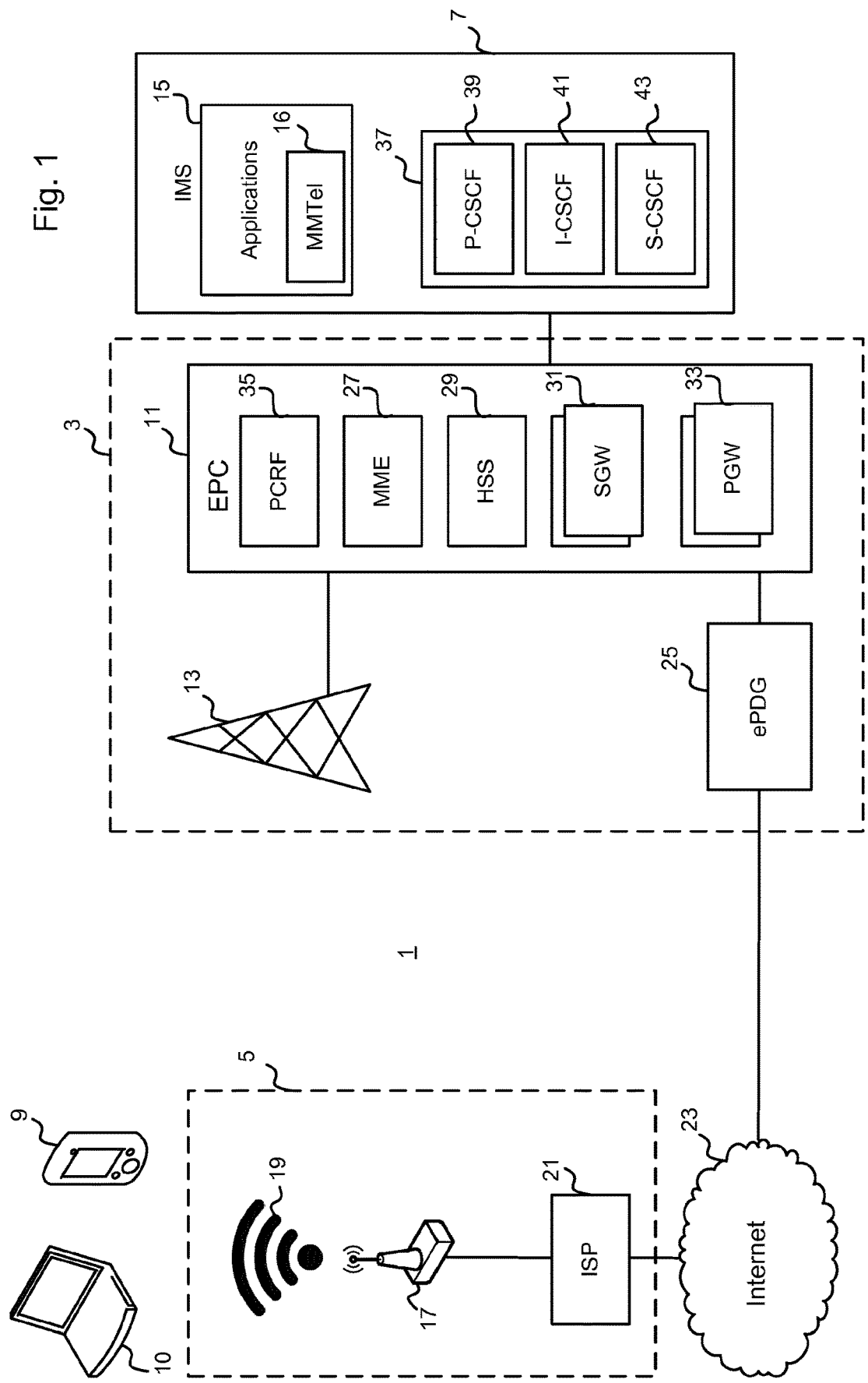

(51) Int. Cl.
*H04L 65/1073* (2022.01)
*H04W 36/38* (2009.01)
*H04L 65/1104* (2022.01)
*H04L 65/102* (2022.01)
*H04W 88/06* (2009.01)
*H04W 88/16* (2009.01)

(52) U.S. Cl.
CPC ....... *H04L 65/1104* (2022.05); *H04W 36/385* (2013.01); *H04L 65/102* (2013.01); *H04W 88/06* (2013.01); *H04W 88/16* (2013.01)

(58) Field of Classification Search
CPC .......... H04W 36/0022; H04L 65/1006; H04L 65/1016; H04L 65/1073; H04L 65/102
See application file for complete search history.

(56) References Cited

U.S. PATENT DOCUMENTS

| | | | |
|---|---|---|---|
| 8,805,374 | B2 | 8/2014 | Zhu et al. |
| 2005/0059400 | A1 | 3/2005 | Jagadeesan et al. |
| 2009/0046655 | A1 | 2/2009 | Zhao et al. |
| 2009/0257361 | A1* | 10/2009 | Deshpande ............. H04L 43/50 370/332 |
| 2010/0003921 | A1 | 1/2010 | Godlewski et al. |
| 2010/0008218 | A1* | 1/2010 | Durnov ............... H04L 41/0686 370/216 |
| 2012/0063428 | A1* | 3/2012 | Ng .................... H04W 36/0016 370/338 |
| 2013/0028172 | A1 | 1/2013 | Lim et al. |
| 2015/0282013 | A1 | 10/2015 | Kim et al. |
| 2016/0044568 | A1 | 2/2016 | White et al. |
| 2018/0167854 | A1* | 6/2018 | Enomoto .............. H04W 36/08 |

FOREIGN PATENT DOCUMENTS

| | | |
|---|---|---|
| GB | 2542826 | 4/2017 |
| GB | 2545930 | 7/2017 |
| KR | 10-2015-0111660 | 10/2015 |
| WO | 2007/076147 | 7/2007 |
| WO | 2017/114932 | 7/2017 |
| WO | 2017/167694 | 10/2017 |

OTHER PUBLICATIONS

Examination Report for GB Application No. 1800804.5 dated Apr. 30, 2015, 2 pages.
International Search Report and Written Opinion of the ISA for PCT/EP2017/057204 dated Apr. 21, 2017, and the International Preliminary Report for Patentability for PCT/EP2017/057204 dated Oct. 2, 2018, 16 pages.
International Search Report and Written Opinion of the ISA for PCT/EP2019/050800 dated Feb. 20, 2019, 11 pages.
Translation of Office Action dated Mar. 4, 2022 issued for Chinese Application No. 201980009005.1 (4 pages).

* cited by examiner

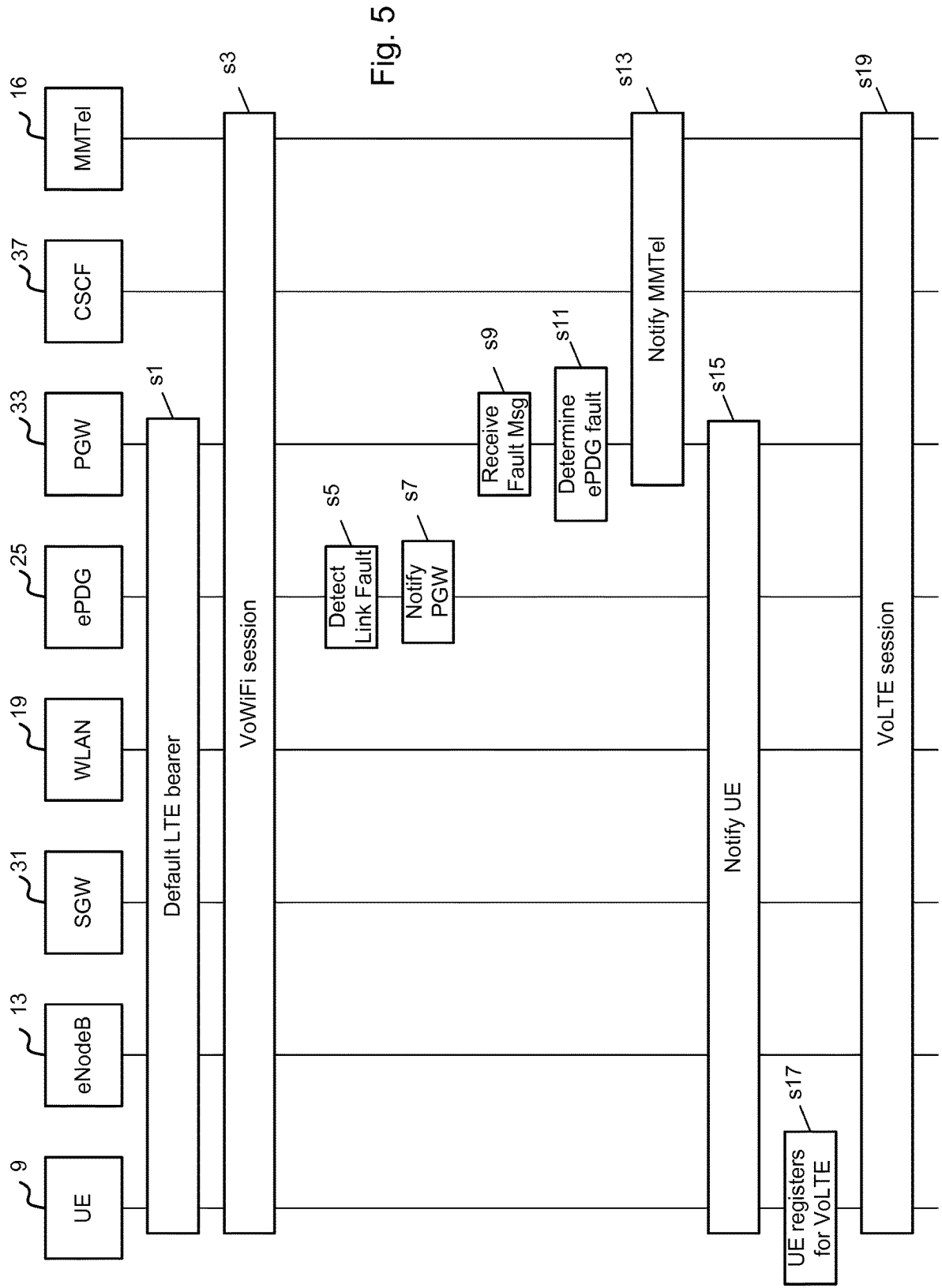

IMS REGISTRATION MANAGEMENT

This application is the U.S. national phase of International Application No. PCT/EP2019/050800 filed Jan. 14, 2019 which designated the U.S. and claims priority to EP Patent Application No. 18152337.4 filed Jan. 18, 2018, the entire contents of each of which are hereby incorporated by reference.

FIELD OF INVENTION

The present invention relates to managing wireless communication services and in particular to a method and apparatus for controlling client device usage of voice service data paths.

BACKGROUND

Cellular data networks provide data connectivity to mobile devices having cellular network interfaces. The network is formed of a network core for handling control plane functions and data packet routing, and a radio access network (RAN) of—typically—macrocell base stations located throughout the coverage area of the mobile network for wireless communication with subscriber mobile devices. An example of a cellular network architecture is Long Term Evolution (LTE). Unlike previous generation second generation (2G) and third generation (3G) cellular networks which offer packet-switched data services over a circuit-switched voice platform, LTE is an all-packet-switched data network architecture that does not support the traditional voice calling platform.

Wireless Local Area Networks (WLANs) operating in accordance with the IEEE 802.11 family of standards (commonly referred to as Wi-Fi™) are common in many user locations and provide data connectivity over a short geographic range. Typically, the wireless local area network is generated and maintained by a wireless Access Point (AP) which acts as a packet routing interface between devices connected to the WLAN (e.g. smartphones, tablets) and local devices connected via a wired Local Area Network (LAN) such as televisions and network attached storage. The wireless access point serves local devices and will typically be co-located, or integrated with an external network interface such as a modem for providing a backhaul link to external networks such as the Internet via an Internet Service Provider's (ISP's) core network. Example backhaul technologies include Digital Subscriber Line (xDSL) copper/fibre and cable based on the Data over Cable Service Interface Specifications (DOCSIS) architecture.

Such a combined AP, routing and modem device will be referred to as a hub throughout the description.

VoIP/VoLTE/VoWiFi

With the change of architecture, there is a need for an alternative way of providing voice communication services. Earlier methods involve Circuit-Switched Fallback (CSFB) to a legacy circuit-switched voice network. To avoid the need for CSFB or a Voice-over-Internet Protocol (VoIP) service, an Internet Multimedia Subsystem (IMS) is connected to the LTE network and hosts a number of applications for use by subscribers of the LTE network, one of which is a telephony application called the MMTel.

When a user of a mobile telephone is connected to the LTE network and makes or receives a voice call, their connection to the MMTel is known as Voice-over-LTE (VoLTE). VoLTE is an example of a Voice-over-Internet Protocol (VoIP) application for allowing voice communication via a LTE cellular network. The voice data is sampled into packets of voice data and the packets are sent over the data network. To prioritise the transmission of voice packets over other types of packet data carried by the LTE network, VoLTE uses optimised headers and priority markings.

Although the packets may arrive in a different order to the transmission order, packet loss is tolerated because latency has a greater negative effect on the quality of experience to the users.

Voice-over-Wi-Fi (VoWiFi) or 'Wi-Fi Calling' provides access to the same MMTel voice service as VoLTE, but the voice data link is initially carried from the mobile handset of the user via a WLAN instead of the cellular radio access network of base stations. In VoWiFi, since the IMS is typically only accessible via LTE network and not the public Internet, User Equipment (UE) must access a specific Internet-facing gateway of the LTE network so that voice calls can be made and received using the standard telephony software and packet data is tunneled to and from the cellular network core. VoWiFi therefore extends the cellular network voice service coverage, particularly to indoor locations. VoWiFi also allows for handover to a normal VoLTE service when the mobile device moves to an outdoor location which is outside of the range of the WLAN.

Mobile devices such as smartphones will therefore have both a cellular network interface and a WLAN interface for data connectivity. Traditionally, WLANs offer cheaper, and occasionally faster and more reliable service, especially in indoor locations, so the mobile device can be configured to prefer the WLAN interface for all data connectivity when both WLAN and cellular access are available.

With the conventional processing, the mobile device is only concerned with the quality of the WLAN signal to the hub. As long as the WLAN signal strength is above a signal strength threshold, the mobile device will stay connected to the WLAN even if there is no onward connection to the external networks such as the Internet. This can cause confusion for users because the phone displays a strong WLAN connection (typically via an icon with various bars to indicate signal strength) but the data services cannot connect and incoming calls may be lost.

The present invention seeks, at least, to alleviate the problems identified above.

STATEMENTS OF INVENTION

In one aspect, an embodiment of the present invention provides a method of operating a packet data gateway in a cellular network located in a data path between a user device and a voice service associated with the cellular network, the user device having a cellular network interface and a wireless local area network interface and connected to the voice service via a wireless local area network data path including a wireless local area network and a non-cellular network gateway of the cellular network, the user device being further operable to access the voice service via cellular network path including a cellular radio access network of base stations, the method comprising: receiving a notification that a fault associated with the non-cellular network gateway has occurred; notifying (optionally, instructing) the user device to access the voice service via the cellular network path; and transferring voice registration and voice data packets between the user device and the voice service via the cellular network path.

In a further aspect, an embodiment of the present invention provides a packet data gateway for use in a cellular network located in a data path between a user device and a voice service associated with the cellular network, the user device having a cellular network interface and a wireless local area network interface and connected to the voice service via a wireless local area network data path including a wireless local area network and a non-cellular network gateway of the cellular network, the user device being further operable to access the voice service via cellular network path including a cellular radio access network of base stations, comprising: a receiver for receiving a notification that a fault associated with the non-cellular network gateway has occurred; a transmitter for notifying (optionally, for instructing) the user device to access the voice service via the cellular network path; and wherein the transmitter and receiver are configured to transfer voice registration and voice data packets between the user device and the voice service via the cellular network path.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

According to another aspect of the invention, there is provided a computer program containing processor-executable instructions for causing a processor to carry out as method as described above.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

The invention extends to a method of operating a packet data gateway and to a packet data gateway as described herein and/or substantially as illustrated with reference to the accompanying drawings.

LIST OF FIGURES

Figure 2:
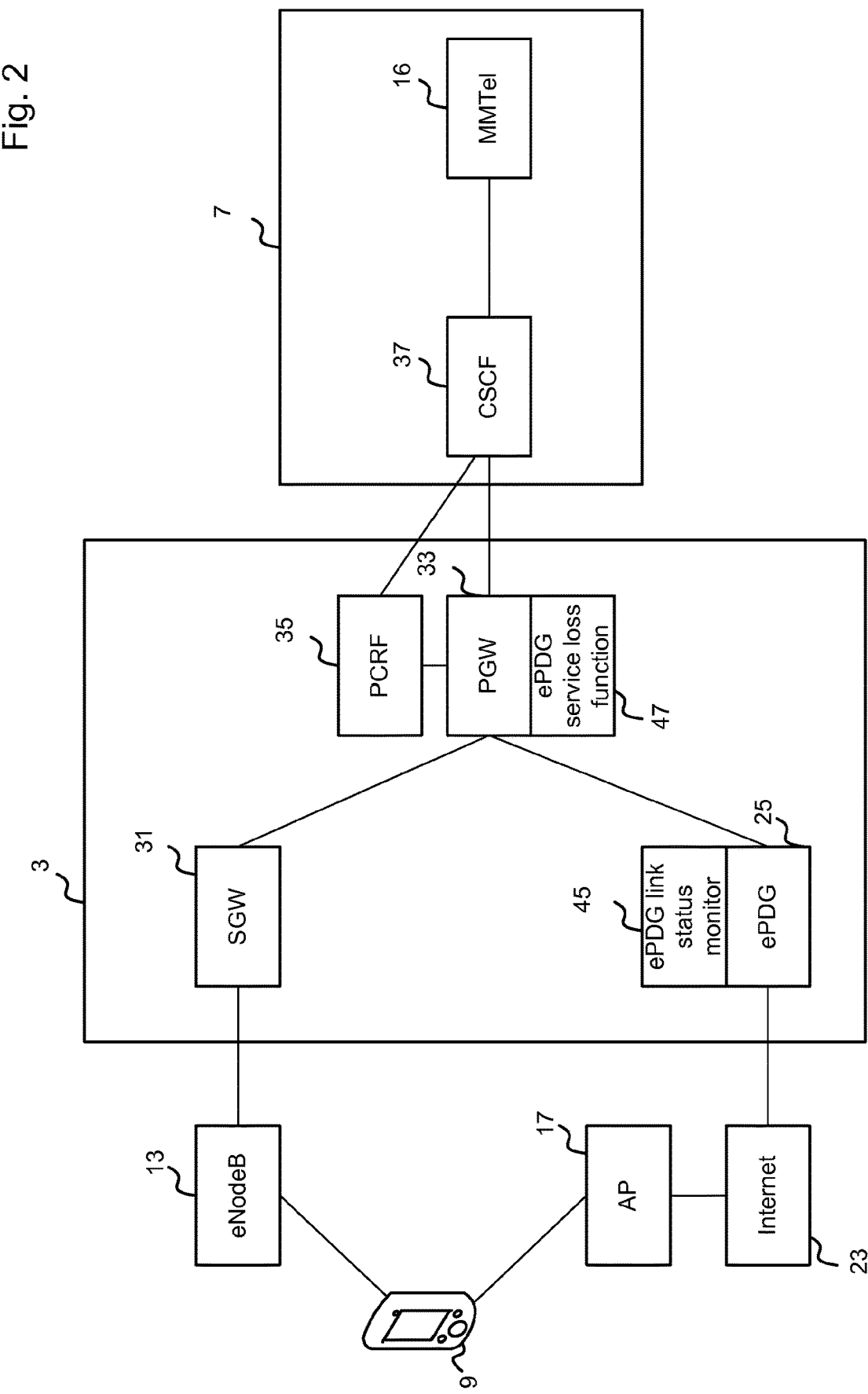
Figure 3:
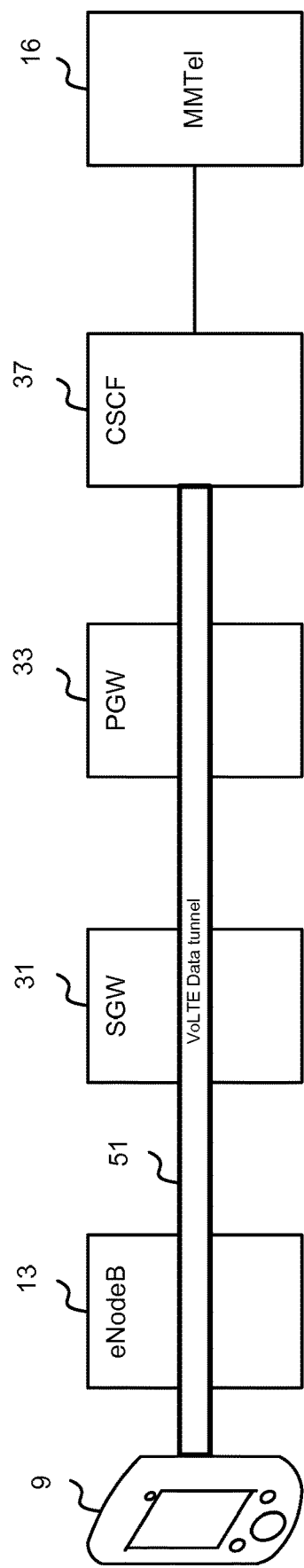
Figure 4:
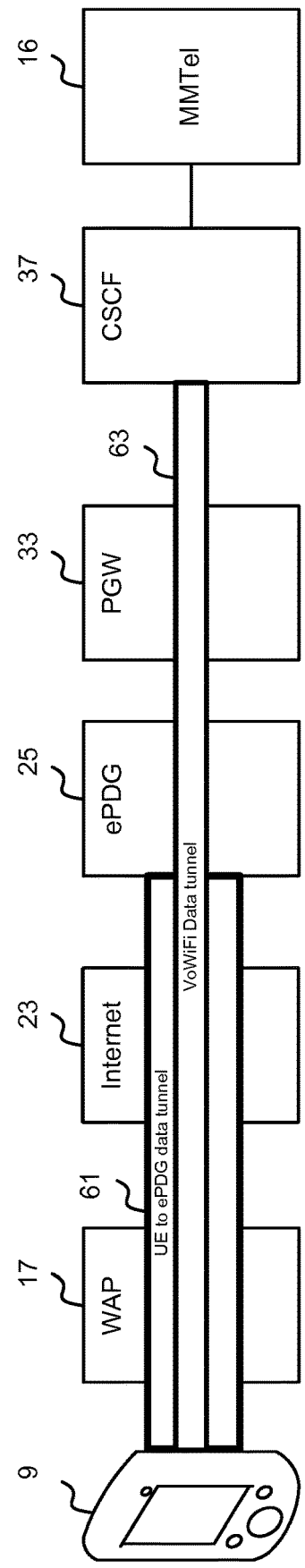
Figure 7:
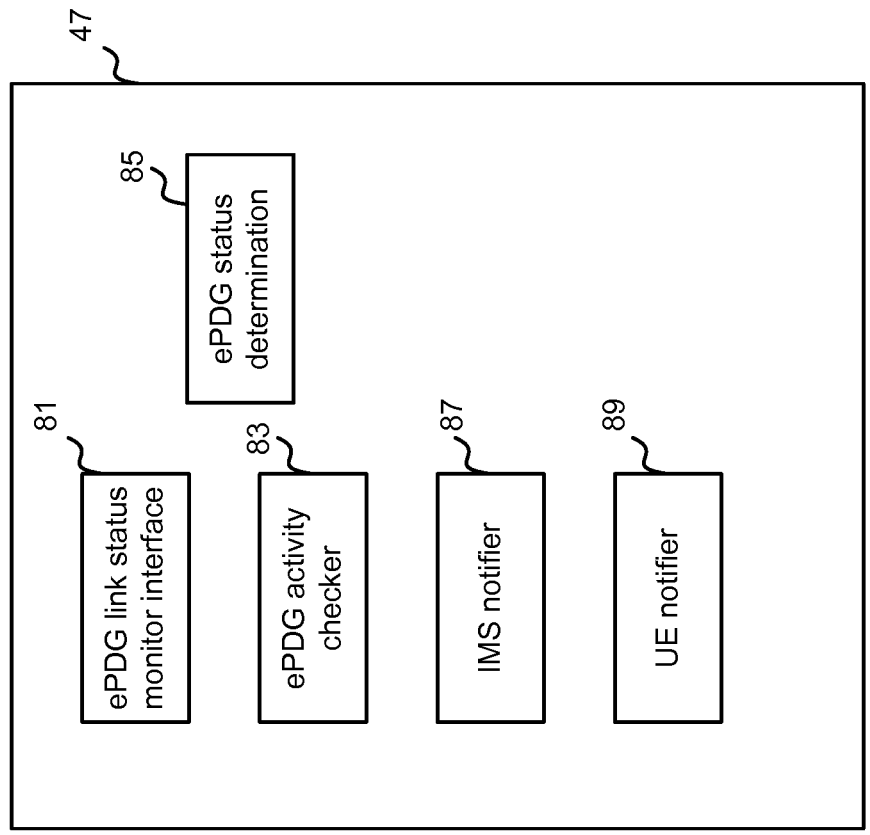
Figure 6:
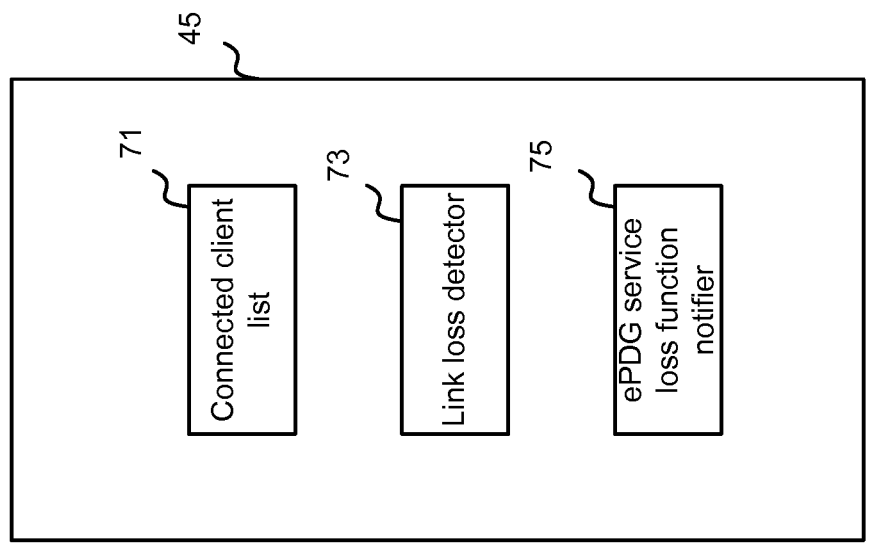

The present invention is now described, purely by way of example, with reference to the accompanying diagrammatic drawings, in which:

FIG. 1 schematically shows an overview of a telecommunications network of a first embodiment;

FIG. 2 schematically shows components of VoLTE and VoWiFi data paths;

FIG. 3 schematically shows the VoLTE data path, including a UE-to-IMS data tunnel;

FIG. 4 schematically shows the VoWiFi data path, including a UE-to-IMS data tunnel traversing a UE-to-ePDG data tunnel;

FIG. 5 is a network component interaction flowchart showing operation according to a first embodiment;

FIG. 6 schematically shows components of an ePDG link status monitor, as illustrated in FIG. 2; and FIG. 7 schematically shows components of an ePDG service loss function, as illustrated in FIG. 2.

SPECIFIC DESCRIPTION

First Embodiment—ePDG Detects Certain Types of Fault with its Internet Link

System Overview

FIG. 1 shows an overview of the main components in a communications system 1 according to a first embodiment. The system 1 has several functional subsystems:
a Long Term Evolution (LTE) cellular network 3 infrastructure;
non-cellular network infrastructure 5; and
an IP Multimedia Subsystem (IMS) 7.

The LTE cellular network 3 provides cellular network client devices, known as User Entities (UE) 9 such as mobile telephones, with data and voice services using a packet-switched IP network. The LTE cellular network 3 includes a network core, known as an Evolved Packet Core (EPC) 11, and a radio access network (E-UTRAN) formed of eNodeBs 13 for connecting services and resources in the EPC 11 to the UEs 9. The EPC 11 contains the standard control functions of a LTE network 3 core such as a Multimedia Mobility Entity (MME) 27, a Home Subscriber Server (HSS) 29, and a Policy Configuration Rules Function (PCRF) 35. A number of Serving Gateways (SGW) 31 manage UE access to the EPC via the eNodeBs and a number of Packet Gateways (PGW) 33 are provided for linking the EPC 11 to external networks such as the Internet and the IMS 5. The EPC 11 also includes an evolved packet data gateway (ePDG) 25 so that devices can access the EPC 11 via non-trusted access networks.

The non-cellular network infrastructure 5 includes a wireless access point/modem router device 17, hereinafter referred to as a hub, located in the home generating a wireless local area network (WLAN) 19 in accordance with the IEEE 802.11 family of standards to allow communication with UEs 9 and also WLAN-only devices 10 such as a computer. For external network access, the hub 17 communicates with an Internet Service Provider (ISP) 21 which routes data via a wide area network such as the Internet 23 to external servers and users. In this embodiment, the UE 9 can connect to the ePDG 25 so that voice communication can be performed via the standard telephone application used by the UE, to avoid the need for a separate application as in the case of VoIP.

The LTE network 3 and non-cellular infrastructure 5 can be regarded as transport networks concerned with moving data packets between the UEs 11 and applications. Meanwhile, the IMS 7 is a Session Information Protocol (SIP) based application and services data network which provides a unified service architecture for all networks. Multiple services can be provided on a single control/service layer even though the access networks may be different. The IMS 7 therefore reduces the need for duplication in data services/applications.

The IMS 7 contains a number of Session Information Protocol (SIP) servers collectively known as the Call Session Control Function (CSCF) 37. The CSCF 37 include a Proxy CSCF (P-CSCF) 39 which acts as a gateway into the IMS 7, an Interrogating CSCF (I-CSCF) 41 which is responsible for assigning Serving CSCF (S-CSCF) 43 servers to a particular device. Each S-CSCF 43 handles SIP registrations between devices and application servers 15.

The CSCF 37 links the LTE network 3 and non-cellular infrastructure 5 to Application servers 15. The voice services used in VoLTE and VoWiFi are hosted in an application server 15 within the IMS 7 known as the Multimedia Telephony Service (MMTel) 16, hereinafter referred to as the MMTel service.

The function of the VoLTE and VoWiFi voice services are defined in IMS profiles. The IMS profile for VoLTE is defined in 3GPP IR.91 and the IMS profile for VoWiFi is defined in 3GPP IR.51, both of which are incorporated by reference.

VoLTE and VoWiFi Data Plane

FIG. 2 shows the connections between network components of the LTE network 3, non-cellular infrastructure 5 and IMS 5 in the VoLTE and VoWiFi data planes that must be established for a UE 9 to carry out voice communication.

LTE and VoLTE Registration

The LTE network 3 provides a control plane and data plane so that control data and user data are transported separately across the EPC 11. The control plane is responsible for user authentication, gateway selection and device mobility/handover. The data plane is established in accordance with the control plane decisions and is responsible for transporting data packets across the EPC 11.

When a UE 9 is first switched on, the UE 9 will attempt to register onto the LTE network 3 by performing a network attach procedure. Firstly the UE 9 performs a cellular scan for an eNodeB 13 of the subscribed LTE network 3. When a suitable eNodeB 13 is detected, the UE 9 connects to the eNodeB 13 to establish a cellular radio link. The eNodeB 13 forms part of the radio access network of the LTE network 3 and so it is responsible for directing traffic into the EPC 11 to establish the control plane and subsequently the data plane.

The eNodeB 13 is linked to the MME 27 which is the main control plane component of the EPC 11. The MME 27 authenticates the UE 9 onto the LTE network 3 by conducting a challenge/response protocol based on credentials derived from a SIM (not shown) located in the UE 9 and details stored in the HSS 29.

Once the UE 9 has successfully authenticated, the MME 27 establishes the data plane to be used by the UE 9 for data sessions with external network resources. The Serving Gateway (SGW) 31 is responsible for carrying data plane packets from the UE 9 into the EPC 11, therefore the MME 27 allocates one of the SGWs 31 in the EPC 11 for use by the UE 9 based on the location of the connected eNodeB 13.

Once allocated, the SGW 31 will identify an associated PGW 33 which provides onward connection to external networks such as the Internet 23 and the IMS 7.

The PGW 33 is also responsible for allocating an IP address for the UE 9 and establishing an initial data plane communication session, known as a default bearer. The PGW 33 is a gateway between the UE 9 located on the LTE network 3 and external resources. The PGW 33 therefore updates internal routing tables so that data packets received from external resources and addressed to the IP address of the UE 9 are routed to the corresponding default bearer for the UE 9 across the EPC 11.

Once the UE 9 has basic connectivity via the LTE network 3, the UE 9 initiates a VoLTE registration with the IMS 7 which is an external network.

A telephony application in the UE initiates a SIP handshake routine with the CSCF 37 (involving the P-CSCF 39/I-CSCF 41/S-CSCF 43) of the IMS 7 to establish a data session from the UE 9 to the MMTel 16 service. The handshake routing includes authenticating the UE 9 using authentication data stored in an IMS HSS (not shown) or the same HSS 29 of the EPC 11. Once the UE 9 is authenticated, the CSCF 37 will create a secure data tunnel 51 (shown in FIG. 3), via the EPC 11 and eNodeB 13 of the LTE network 3, to the UE 9. Details of the data link including the secure data tunnel 51 will be provided to the PCRF 35 which translates the requirements into 3GPP standard tasks to be implemented by the EPC 11.

Furthermore, since voice has high quality of service (QoS) requirements, the PGW 33 will establish a new IMS default bearer to the UE 9 with a higher transmission priority known as a QoS Class Indicator (QCI) level, for example a QCI level of five whereas the overall default bearer has a QCI level of 9. Control packets received from the IMS 7 are routed through the IMS default bearer instead of the default bearer. Furthermore, when a user of the UE 9 initiates a VoLTE call or receives a call, an IMS dedicated bearer is established, with much tighter requirements for packet delivery in terms of throughput and latency. In the case of VoLTE, the dedicated bearer may be established with a QCI of 1 indicating that these packets have the highest delivery priority.

After the above sequence of processing, the UE 9 is wirelessly connected to an eNodeB 13 of the LTE network 3, has been allocated an IP address by the PGW 33 and also established an IMS default bearer to the MMTel 16 service.

As shown, the data plane path between the UE and MMTel for VoLTE is:

UE→eNodeB→Serving Gateway (SGW)→Packet Gateway (PGW)→CSCF→MMTel service

FIG. 3 shows a simplified view of the data connection, including the data tunnel 51 connection between the P-CSCF of the CSCF 37 and the UE via the EPC.

VoWiFi Registration

Returning to FIG. 2, the VoWiFi data plane will now be described.

When the UE 9 is in the range of a WLAN 19 generated by a wireless access point/router/modem device 17, hereinafter referred to as a hub, the UE 9 will attempt to authenticate and associate onto the WLAN 19 for data connectivity with external resources. As shown in FIG. 1, the hub 17 is connected to an ISP 21 via a broadband link based on, for example the Very High Digital Subscriber Line (VDSL) protocol or a cable protocol such as the Data Over Cable Service Interface Specification (DOCSIS). The ISP 21 then connects the UE 9 to a wide area network such as the Internet 23. The UE 9 will be assigned a private network IP address and the hub 17 (which has a public network IP address for the entire local network) carries out network address translation (NAT) to allow a number of devices connected to the WLAN 19 to share the public IP address.

VoWiFi allows voice and messaging data, normally carried by the eNodeB 13 radio access network of the LTE network 3, to be carried over the WLAN 19 and broadband link into the EPC 11. This is known as Wi-Fi Offload and reduces the processing load on the radio access network of eNodeBs 13 and can reduce a user's LTE network data charges.

WiFi Offload is enabled by the provision in the EPC 11 of an Evolved Packet Data Gateway (ePDG) 25 to provide an entry point into the EPC 11 via external networks other than the RAN of eNodeBs. In LTE, these non-cellular data networks are defined as non-trusted 3GPP IP systems since they do not necessarily belong to the LTE network operator and therefore data security through the external network cannot be guaranteed.

Unlike the other network components of the EPC 11, the ePDG 25 has a public IP address so that other network devices can discover and establish communication sessions with the ePDG 25. However, to secure the communication sessions over the non-trusted 3GPP networks, the ePDG 25 is configured to establish secure data tunnels 61 (shown in FIG. 4) to the UE 9 so that intermediary devices in the data link such as the hub 17, ISP 21 and Internet 23 routing nodes cannot read the contents of the packets. The IP Security (IPSec) protocol is used so that any data packets are encrypted as the travel through the tunnel 61 to the UE 9.

Furthermore, the UE 9 must provide credentials to prove that it is a valid subscriber of the cellular network before the ePDG 25 will allow the UE 9 to use EPC 11 resources. Since the UEs 9 in this embodiment can also access the LTE network 3, a variant of the Extensible Authentication Protocol (EAP) authentication framework is used such as EAP-AKA where UE 9 will authenticate based on credentials stored on a Subscriber Identity Module (SIM) (not shown) located in the UE 9.

Once authenticated, the ePDG 25 updates the control plane by notifying the MME 27 that a UE 9 that was previously connected to an eNodeB 13 is now located on a WLAN 19. The data plane is then established by creating a default bearer with the PGW 33, wherein the PGW 33 also provides the IP address previously allocated to the UE 9 to the UE 9 at the new connection via the ePDG 25. In this way, the UE 9 can still be addressed and located even after a handover to a different access network for voice and messaging services.

Unlike the LTE data plane, the UE 9 may only use the LTE network 3 for access to the IMS 7 and MMTel 16 service since the UE 9 can access other remote resources such as email and Internet browsing via the ISP 21 directly without incurring the overhead of the ePDG 25 security and tunnelling.

The UE 9 therefore requests VoWiFi registration which involves establishing an IMS default bearer with a P-CSCF 39 and SIP session with the MMTel 16 service wherein a second tunnel 63 is established between the CSCF 37 and UE 9. From the PGW 33 to the MMTel 16 service, the data path is the same as the LTE data plane.

The data path for VoWiFi is therefore:

UE→AP→Internet→ePDG→PGW→CSCF→MMTel service.

FIG. 4 shows a simplified view of the UE VoWiFi data connection, including the data tunnel connection 61 between the P-CSCF and the UE via the EPC travels via the second data tunnel 63 between the ePDG and the UE.

WLAN Preference

As described above, the UE 9 has both WLAN and LTE interfaces and is capable of both VoLTE and VoWiFi call handling. Since an eNodeB 13 of the LTE network has a larger geographical coverage range than a WLAN 19, in general the UE will be connected to the LTE network 3 and will use VoLTE.

However, when the UE is within range of a WLAN 19, there is overlap in the connectivity ranges, and the UE 9 can connect to data services using either the cellular interface or the WLAN interface. In general, the default UE connection policy is that a WLAN connection is preferred. So when a UE 9 is connected to the LTE network 3 for voice and data connectivity and it detects a known WLAN 19, the UE 9 will try to connect to the WLAN 19.

Once connected to the WLAN 19, the VoWiFi data plane shown in FIG. 2 and FIG. 4 will be established so that calls can be made and received over VoWiFi.

After a VoWiFi connection has been established between the UE 19 and MMTel 16 service, the standard behaviour is for the UE 9 to maintain the WLAN 19 connection until the UE's 9 location changes such that it is no longer within range of the WLAN 19. When the WLAN interface of the UE detects the dropped WLAN 19 connection, the UE 9 will activate the LTE interface and once the UE has registered onto the LTE network 3 via an eNodeB 13, VoLTE service will be established so that the UE 9 can continue to make and receive calls.

However, the conventional UE 9 behaviour is to only consider the WLAN quality strength and not the overall link to the remote resource. As long as the UE 9 is connected to a WLAN 19 with sufficient signal strength, if the onward connection to the ePDG 25 develops a fault, the UE 9 will not trigger a switch to LTE and VoLTE to maintain the voice service connection.

In some cases a UE 9 will have a timer to send a heartbeat signal to the ePDG tunnel 61 end point, but to save battery, the timer interval is set at a high value of several minutes so it is not able to respond to service loss in a rapid manner. Similarly the UE 9 dialler application will periodically send a heartbeat or re-registration message via the second data tunnel 63 to the CSCF 37 of the IMS 7, but the timer is configured to be a high value. During a time period when there is a fault in the VoWiFi link but the UE 9 is not aware, the MMTel 16 service will not be able to route calls to the UE 9.

In a case where the user of the UE 9 tries to place a VoWiFi call but is unable to, then the UE 9 will typically recognise that there is a fault with the VoWiFi link and initiate a VoLTE registration via the LTE network 3. Alternatively, the user may manually disable the WLAN interface so that the UE 9 connects to the LTE network 3 and carries out a VoLTE registration. However, such a manual intervention negatively impacts the user experience since the first instance of making a call fails.

ePDG Monitoring

In this embodiment, the ePDG 25 and PGW 33 are configured to monitor for disruptions in connectivity affecting the ePDG link to the Internet 23 or a fault at the ePDG 25 which have an impact on the availability of the VoWiFi service to UEs 9.

FIG. 5 is a flowchart showing the overall operation in the first embodiment for a network based VoWiFi fault detection and VoLTE handover process.

In step s1 the UE 9 attaches to the LTE network 3 via the eNodeB 13 and has a default bearer from the UE 9 to the PGW 33 and in the presence of a WLAN 19, in step s3 the UE 9 registers for VoWiFi instead of VoLTE in accordance with the usual preference for WLANs.

During the time that VoWiFi is active, in step s5 the ePDG 25 monitors for link faults to the UE 9 which may affect the ability to provide VoWiFi even though the local WLAN 19 link used by the UE 9 is functional. Such link faults may be caused by connectivity problems between the hub 17 and the ISP 21, the ISP 21 to the Internet 23, Internet 23 links towards the ePDG 25, or a combination all the above factors. If a fault is detected, then in step s7, the ePDG 25 notifies the PGW 33.

In the step s9, the fault message is received by the PGW 33 and processing is also performed by the PGW 33 in step s11 to determine whether a fault has occurred at the ePDG 25 itself. Once an ePDG 25 related fault has been identified, then in step s13 the MMTel 16 is notified so that the MMTel 16 service is aware of the service disruption so that incoming voice calls can be held. The notification to the MMTel 16 service is delivered via the PCRF 35, the P-CSCF 39 and S-CSCF 43.

In step s15 the PGW 33 uses the default bearer to the eNodeB 13 to identify the logical location of the UE 9 and to inform the UE 9 the requirement for a VoLTE switch.

In step 17, the UE 9 initiates registration for a new IMS VoLTE session and in step s19 a VoLTE session is established.

FIG. 2 also shows an ePDG link status monitor 45 associated with the ePDG 25 and an ePDG service loss function 47 associated with the PGW 33.

The ePDG link status monitor 45 is responsible for detecting faults affecting the data link to the ePDG 25 via the Internet 23 which would affect the ability of UEs to access the EPC 11 and IMS 7 resources.

The ePDG service loss function 47 receives fault notifications from the ePDG link status monitor 45 and also monitors the availability of the ePDG 25 within the EPC 11. Following receipt of this message, the PGW 33 informs the MMTel 16 service of the service loss by sending a control plane message via the PCRF 35 and the CSCF 37.

Once notified via the PCRF 35, the MMTel 16 marks the VoWiFi link as inactive. With the above processing, any incoming calls placed during the outage will be successfully diverted to voicemail, but calls cannot be routed to the UE 9 and equally calls cannot be made by the UE. This is because the UE still believes it is connected to VoWiFi on the basis that the WLAN 19 is still active.

To cause the UE to override the standard behaviour of preferring WLAN 19 connections and connect to VoLTE even when the WLAN 19 is available, the PGW 33 must inform the UE 9 that there is a fault with the VoWiFi link.

Since the PGW 33 allocated the IP address to the UE 9 when the UE 9 registered to the LTE network 3, the PGW 33 maintains a default bearer to the UE 9 over LTE while the UE 9 is idle on the LTE network 3. The PGW 33 uses this default bearer to notify the UE 9 to register for VoLTE.

In response, the UE 9 will enable its LTE interface to register for VoLTE as described above. In the current network architecture, a limitation exists that VoLTE and VoWiFi IMS registrations must always be initiated by the UE 9 rather than the network 3.

Following the operation of the above functions, a fault associated with the ePDG 25 and VoWiFi service can be detected and the UE 9 can be notified to switch to VoLTE to maintain voice connectivity.

ePDG Link Status Monitor

FIG. 6 shows the components of the ePDG link status monitor 45 in more detail.

The ePDG link status monitor contains a connected client list 71, link loss detector 73 and a PGW notifier 75.

The connected client list 71 stores details of any UEs 9 which are currently connected to the ePDG 25 via an IPSec tunnel and therefore registered for VoWiFi.

The link loss detector 73 is configured to monitor the status of the connection of the ePDG 25 to the UEs on the connected client list 71 in order to detect service loss. The loss may only affect a single UE 9, a subset of UEs 9 or all UEs 9 using VoLTE depending on the source of a fault. For example, a fault at a single hub 17 may only affect a single UE 9, while a fault at the ISP 21 may affect tens or hundreds of UEs 9.

To monitor the connectivity status of a link to a UE 9, the link loss detector 73 performs two tests concurrently:

1) Send periodic heartbeat signals via the tunnel 61 to the UE 9. If the message is not acknowledged, then the connection is deemed to be faulty. In this embodiment this is every 30 seconds 2) Set a timer on the IPSec tunnel 61 and if a predetermined amount of time has elapsed without any data traffic being received from the tunnel 61, infer a faulty UE connection. In this embodiment, the countdown period is every 20 seconds.

The heartbeat and countdown tests are equally valid in determining that a fault has occurred on some part of the data path between the UE 9 and the ePDG 25, and may therefore be implemented independently or in combination.

If either of the monitored test indicates that a fault is present, then the PGW notifier 75 sends a control message to the ePDG service loss function 47.

ePDG Service Loss Function 47

FIG. 7 shows the components of the ePDG service loss function 47 associated with the PGW 33. This function 47 contains an ePDG link status monitor interface 81, an ePDG activity checker 83, an ePDG status determination function 85, an IMS notifier 87 and a UE notifier 89.

The ePDG link status monitor interface 81 is linked to ePDG link status monitor 45 so that any fault messages from the PGW notifier 75 can be received and processed. These messages can be received while the ePDG 25 is active. To detect the case where the ePDG 25 itself develops a fault or the communication link between the ePDG 25 and the PGW 33 develops a fault, the ePDG activity checker 83 is configured to periodically send a heartbeat message to the ePDG.

The ePDG status determination function 85 receives inputs from both the ePDG link status monitor interface 81 and the ePDG activity checker 83. If a fault message is received from either input, the ePDG status determination function 85 triggers the IMS notifier 87 to communicate with the IMS 7 and the UE notifier 89 to communicate with the UE so that it can register for VoLTE.

With the above processing and interaction between the network components, a UE 9 can be directed to switch from VoWifi to VoLTE when the network determines that an ePDG 25 has developed a fault.

Reverting to VoWiFi

The above described processing by the ePDG 25 and PGW 33 enables the LTE network 3 to help the UE 9 switch over to a VoLTE connection more quickly, in the event of a network failure between the UE 9 and the ePDG 25 via an untrusted network or a failure of the PGW 33, to minimise service loss to the MMTel 16 voice service.

Due to data costs to the subscriber of the UE 9 and infrastructure costs on the LTE network 3, it is desirable to re-enable WiFi Offload where possible.

To enable the UE 9 to make greater use of the available WLANs 19, in this embodiment the ePDG 25 is configured to continue testing the status of the ePDG 25 to UE 9 link and if the link between the ePDG 25 and UE 9 is restored, the ePDG 25 will send a Link restored message to the PGW 33 for onward delivery to the MMTel 16 service using VoWiFi.

When the PGW 33 receives a link restored message, it will identify any UEs 9 which were previously instructed to switch to VoLTE when the ePDG link fault was detected and notify those UEs 9 using the previous WLAN related default bearer.

When the UE 9 receives a message from the PGW 33, the UE 9 will decide whether to switch to VoWiFi via the WiFi link or remain on VoLTE based on a device policy. If required, the UE 9 will initiate a VoWiFi registration.

Alternatives and Modifications

In the embodiment, the PGW 33 notifies the UE 9 of a need to switch from VoWiFi to VoLTE using the default LTE bearer. In an alternative, the PGW 33 creates a new dedicated bearer to communicate with the UE 9.

In the embodiment, the PGW 33 notification is carried out as a link failure is detected on a UE 9 by UE 9 basis. This can lead to a lot of internal control messages between the ePDG 25 and a PGW 33.

In an alternative, the ePDG 25 is configured to log all disconnected UEs 9 occurring within a set time period, for example every 2 minutes, before notifying the PGW 33 with a set of UEs 9. Such a method will save internal processing, but will increase the time required to respond to a line disconnection which may lead to a slower response time.

In the embodiment, the UE 9 is instructed to switch to using VoLTE when the VoWiFi connection via the ePDG 25 is deemed to be non-operational. Therefore the UE 9 voice service is switched to VoLTE while other data services continue using the WLAN 19 due to the cost benefits and often higher bandwidth available through WLANs.

In an alternative, the UE 9 is configured to switch all of the data bearers to LTE when there is a service disruption. Therefore the UE 9 will not use the WLAN at all but will instead switch all data connections to the LTE network 3.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of operating a packet data gateway in a cellular network located in a data path between a user device and a voice service associated with the cellular network, the user device having a cellular network interface and a wireless local area network interface and connected to the voice service via a wireless local area network data path including a wireless local area network and a non-cellular network gateway of the cellular network, and the user device being further operable to access the voice service via a cellular network path including a cellular radio access network, the method comprising:
    receiving a notification that a fault associated with the non-cellular network gateway has been detected during a time that the wireless local area network data path is functional and the wireless local area network is active;
    notifying the user device to access the voice service, said access to be performed via the cellular network path; and
    transferring voice registration and voice data packets between the user device and the voice service via the cellular network path.

2. A method according to claim 1, further comprising the step of notifying the voice service of the occurrence of the fault.

3. A method according to claim 1, wherein the notification that a data link to the user device is not functional is received from the non-cellular network gateway.

4. A method according to claim 1, wherein the notification that a fault associated with the non-cellular network gateway has occurred is received by the cellular network.

5. A method according to claim 1, wherein a fault in the non-cellular network gateway is detected, by the user device, a wireless local area network access point or by an Internet Service provider.

6. A method according to claim 1, wherein the user device is notified by establishing a new data path from a packet data network and to the user device.

7. A method according to claim 6, wherein the user device is notified by establishing the new data path from the packet data network, and from the cellular network, to the user device.

8. A method according to claim 1, wherein the transferring of the voice registration and voice data packets is performed only via the cellular network path.

9. A method according to claim 1, wherein the fault is identified by the packet data gateway in the cellular network, and the notifying of the user device to access the voice service is provided through the packet data gateway in the cellular network.

10. A method according to claim 1, wherein the fault is caused by a connectivity problem on the wireless local area network data path towards the non-cellular network gateway.

11. A packet data gateway for use in a cellular network located in a data path between a user device and a voice service associated with the cellular network, the user device having a cellular network interface and a wireless local area network interface and the user device being operable to connect to the voice service via a wireless local area network data path including a wireless local area network and a non-cellular network gateway of the cellular network, the user device being further operable to access the voice service via cellular network path including a cellular radio access network of base stations, comprising:
    a receiver for receiving a notification that a fault associated with the non-cellular network gateway has been detected during a time that the wireless local area network data path is functional and the wireless local area network is active;
    a transmitter for notifying the user device to access the voice service, said access to be performed via the cellular network path; and
    wherein the transmitter and receiver are configured to transfer voice registration and voice data packets between the user device and the voice service via the cellular network path.

12. A packet data gateway according to claim 11, wherein the transmitter is configured to notify the voice service of the occurrence of the fault.

13. A packet data network according to claim 11, wherein the notification is received from the non-cellular network gateway that a data link to the user device is not functional.

14. A packet data gateway according to claim 11, wherein a fault in the non-cellular network gateway is detected, by the user device, a wireless local area network access point or by an Internet Service Provider.

15. A packet data network according to claim 11, wherein the user device is notified by establishing a new bearer data link from a packet data network and to the user device.

16. A packet data network according to claim 15, wherein the user device is notified by establishing the new bearer data link from the packet data network, and the cellular network, to the user device.

17. A non-transitory computer-readable storage medium comprising instructions that, when executed by a processor associated with a telecommunications network, causes the telecommunications network to perform the method according to claim 1.

18. A packet data network according to claim 11, wherein the packet data gateway in the cellular network includes a processor for identifying that the fault associated with the non-cellular network gateway has occurred, and the notifying of the user device to access the voice service is provided through the packet data gateway in the cellular network.

19. A packet data network according to claim 11, wherein the fault is caused by a connectivity problem on the wireless local area network data path towards the non-cellular network gateway.

* * * * *